C. P. HOLLAND.
FIRELESS COOKER.
APPLICATION FILED JUNE 9, 1910.

1,008,468.

Patented Nov. 14, 1911.

WITNESSES:
H. Brocheron
R. Menk

INVENTOR
Charles P Holland
BY
Alan M. Johnson
ATTORNEY

UNITED STATES PATENT OFFICE.

CHARLES P. HOLLAND, OF NEW YORK, N. Y.

FIRELESS COOKER.

1,008,468.      Specification of Letters Patent.     Patented Nov. 14, 1911.

Application filed June 9, 1910. Serial No. 565,990.

*To all whom it may concern:*

Be it known that I, CHARLES P. HOLLAND, a citizen of the United States, and a resident of New York city, in the county of New York and State of New York, have invented certain new and useful Improvements in Fireless Cookers, of which the following is a specification.

This invention relates to the culinary art and more particularly to an apparatus known in that art as a fireless cooker. As is well known these devices are used to retain the heat in the article which has been previously heated upon a stove, so that the cooking there started will be continued in the fireless cooker without the danger of burning, or the necessity of constantly watching the food which is being cooked. In some cases, of course, the fireless cookers are used simply to retain the heat in the articles which have been cooked until such time as they are served; primarily, however, they are meant to continue the cooking which has been previously started on a stove or other source of heat.

My invention more particularly relates to a simplified form of fireless cooker and one which can be manufactured at a minimum expense.

Certain other features of my invention will be pointed out more fully in the specification, and in the claim.

Figure 1:
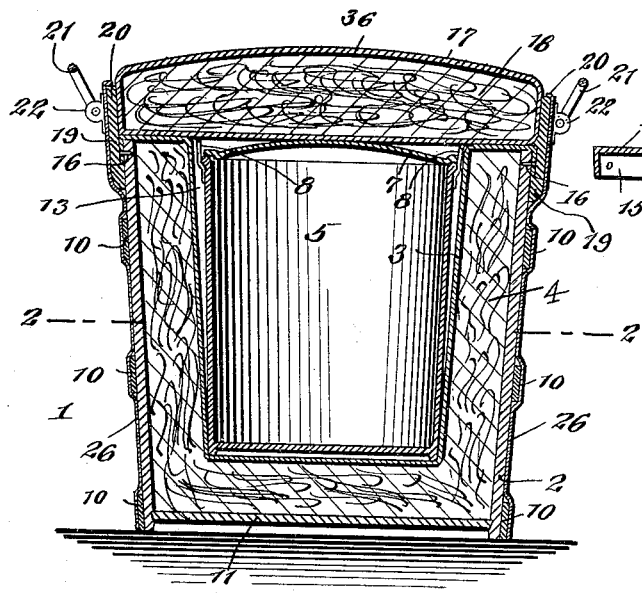
Figure 3:
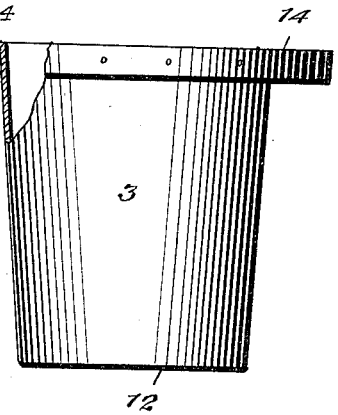
Figure 2:
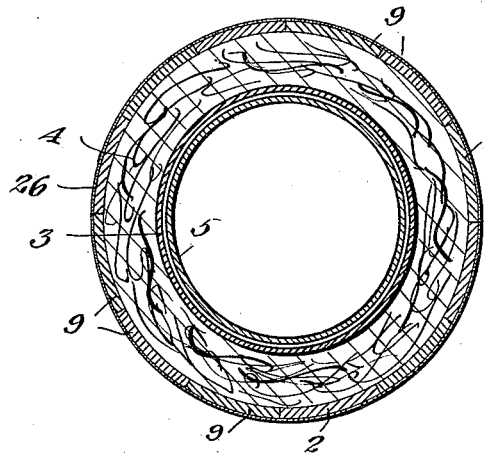
Figure 4:
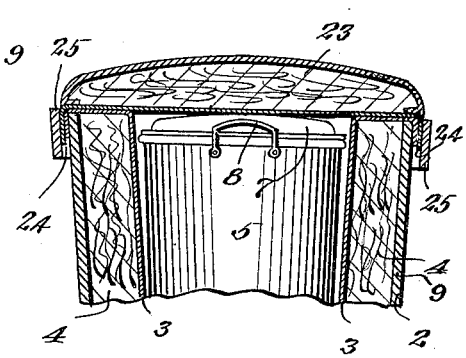

In the accompanying drawing showing an illustrative embodiment of my invention, and in which the same reference numerals refer to similar parts in the several figures, Figure 1 is a vertical section taken through my fireless cooker and a cooking utensil located therein; Fig. 2 is a horizontal section on line 2—2 of Fig. 1; Fig. 3 is a side elevation, partly in vertical section, of the inner receptacle; Fig. 4 is a vertical section showing a modification, the cooking utensil in this figure being shown in side elevation.

In the illustrative embodiment of my invention shown in the drawing, 1 is the complete fireless cooker. This cooker consists essentially of an outer receptacle 2 and an inner receptacle 3 of peculiar configuration and between them a packing 4 preferably of excelsior for the sake of cheapness, though this packing may be of hay, hair, or any other material, which will serve to prevent the radiation of the heat from the cooking utensil 5. This cooking utensil 5 may be of any approved construction. As I have here shown it, it consists of a vessel having a lid 7 and handles 8, 8. It may be given, however, various forms and configurations without departing from my invention, and may be made of various materials such as enamel ware, earthen ware, or other suitable material. The outer receptacle 2 may also be formed of different materials. I have found in practice, however, that a very efficient outer receptacle and one which will completely inclose and hold the excelsior or other lining is a vessel or tub which may be made of a series of staves 9, 9 held together by hoops 10, 10, the bottom of the vessel being closed by a head 11, Fig. 1. In practice I have found that a very efficient tub, and one which can be easily obtained on the market is a butter firkin, though it is. to be understood that my invention is not confined to this or any other particular form of outer receptacle, or tub.

The inner receptacle 3 is formed of any suitable material and has, in the preferred form of my invention, a shape substantially like an inverted hat, the crown 12 lying nearest the head 11 of the tub and forming the bottom of the inner recess 13 of the fireless cooker, within which the cooking utensil 5, of whatever shape it may be, is inserted. The rim 14 of the inner receptacle 3 is adapted to inclose and cover the packing 4, the end of the rim 14 resting upon the upper ridge or edge of the tub 2, by which means the inner receptacle is supported within the tub. I preferably also provide the rim 14 with a downwardly extending flange 15 which lies just outside of the upper rim of the tub 2 and through this flange 15 I preferably, though not necessarily, pass nails, screws, or other fastening devices 16, (Fig. 1) to securely hold the inner receptacle 3 to the outer receptacle or tub 2. This will prevent the accidental removal of the inner receptacle and also serves to securely hold the packing 4 between the inner and outer receptacles and prevents any portions of it being accidentally thrown out on the floor or table, to possibly contaminate the food which may be in the cooking utensil. This inner receptacle 3 may be formed from various materials. Preferably I make it of tin or of some similar thin metallic substance which will permit it to be readily bent into the desired shape, and which will permit it being made at minimum expense. It will, therefore, be seen that the body of the fireless cooker is formed by the use of my inner, preferably metallic receptacle 3, and the outer receptacle, or tub 2. This insures the use of the minimum number of parts and ones which thoroughly protect and screen at all points, from view or contamination, the packing 4, and permit the interior of the inner receptacle 3 to be washed out and sterilized at any time without dampening, or injuring, or reducing the efficiency of the packing 4, thereby rendering the fireless cooker a sanitary one.

The upper member of my fireless cooker consists of a cover 36 which is preferably, though not necessarily, so formed as to have some slight resiliency. For the sake of cheapness in manufacture this cover consists essentially of a covering 17 of any suitable material such for instance as cloth, oil cloth, linoleum, or other cheap flexible material, which is filled with a packing 18, preferably of excelsior, or some other suitable packing which is generally, though not necessarily, the same as the packing 4 used in the body of the fireless cooker. I preferably form this cover or pad 36 so that it completely covers not only the top 7 of the cooking utensil 5, but also the entire tub or other receptacle 2 (Fig. 1). This cover may be laid loosely on the top of the tub or other receptacle 2. Preferably, however, I mount a hoop 19, or other equivalent member, on the upper edge of the tub 2 so that the upper edge 20 of the hoop 19 will extend some little distance above the upper edge of the staves 9, 9, or the upper rim of the tub or outer receptacle 2, however it may be formed. The cover of pad 36 is given a diameter which will insure it snugly fitting within the hoop 19, it being preferably so formed that a slight pressure is necessary to force it to its seat on the top of the outer receptacle or tub 2. This insures the cover being held and will prevent its accidental removal.

In some cases, though not necessarily, I may provide my fireless cooker with a handle or handles of any approved construction such as the handles 21, 21, Fig. 1, which are pivotally secured to the hoop 19 by means of fastenings 22, 22; though, of course, it is to be understood that any other suitable form of handle or handles may be used if desired.

Under some circumstances it may be desirable to have a removable securing means for removably attaching the cover or pad to the inner and outer receptacles. In Fig. 4 I have shown a modification in which the cover or pad 23 is provided with a flexible apron 24 which in its operative position will lie just outside of the upper rim of the outer receptacle or tub 2. To coöperate with this apron 24 and to secure it, together with the pad or cover 23 in position, I use a removable hoop 25 which is adapted to be passed over the pad 23, its diameter being such that it will bind the apron 24 to the upper edge of the outer receptacle and thereby form an efficient and cheap means for detachably fastening the cover 23 to the outer receptacle.

In some cases to enhance the appearance of the fireless cooker and to make it more pleasing to the eye I may, though not necessarily, cover the outer receptacle or tub 2 with a covering 26 which may be of any suitable material, but which for the sake of cheapness in manufacture is preferably oil cloth, linoleum, or some flexible material which will snugly fit the outer receptacle or tub 2 and which may be painted, varnished, or otherwise decorated or finished in any other suitable manner.

Having thus described this invention in connection with illustrative embodiments thereof to the details of which I do not desire to be limited, what is claimed as new and what it is desired to secure by Letters Patent is set forth in the appended claim:

In a fireless cooker, the combination with an outer receptacle, of an inner receptacle located therein and spaced therefrom, packing between the inner and outer receptacles, said inner receptacle being provided with a rim comprising a horizontal portion which extends from the upper edge of the inner receptacle to and over the upper edge of the outer receptacle and terminates in a downwardly extending annular flange which is secured to the outer receptacle, a flexible pad forming a cover which completely covers both the inner and outer receptacle, a flexible extension formed upon said pad, and a hoop located outside of the outer receptacle and adjacent the top edge thereof, said hoop serving to clamp the flexible extension of the pad between itself and the outer face of the downwardly extending annular flange of the inner receptacle, whereby said pad is maintained in position and a tight packing is provided.

CHARLES P. HOLLAND.

Witnesses:
ALAN M. JOHNSON,
ROSE MENK.